United States Patent Office 2,956,573
Patented Oct. 18, 1960

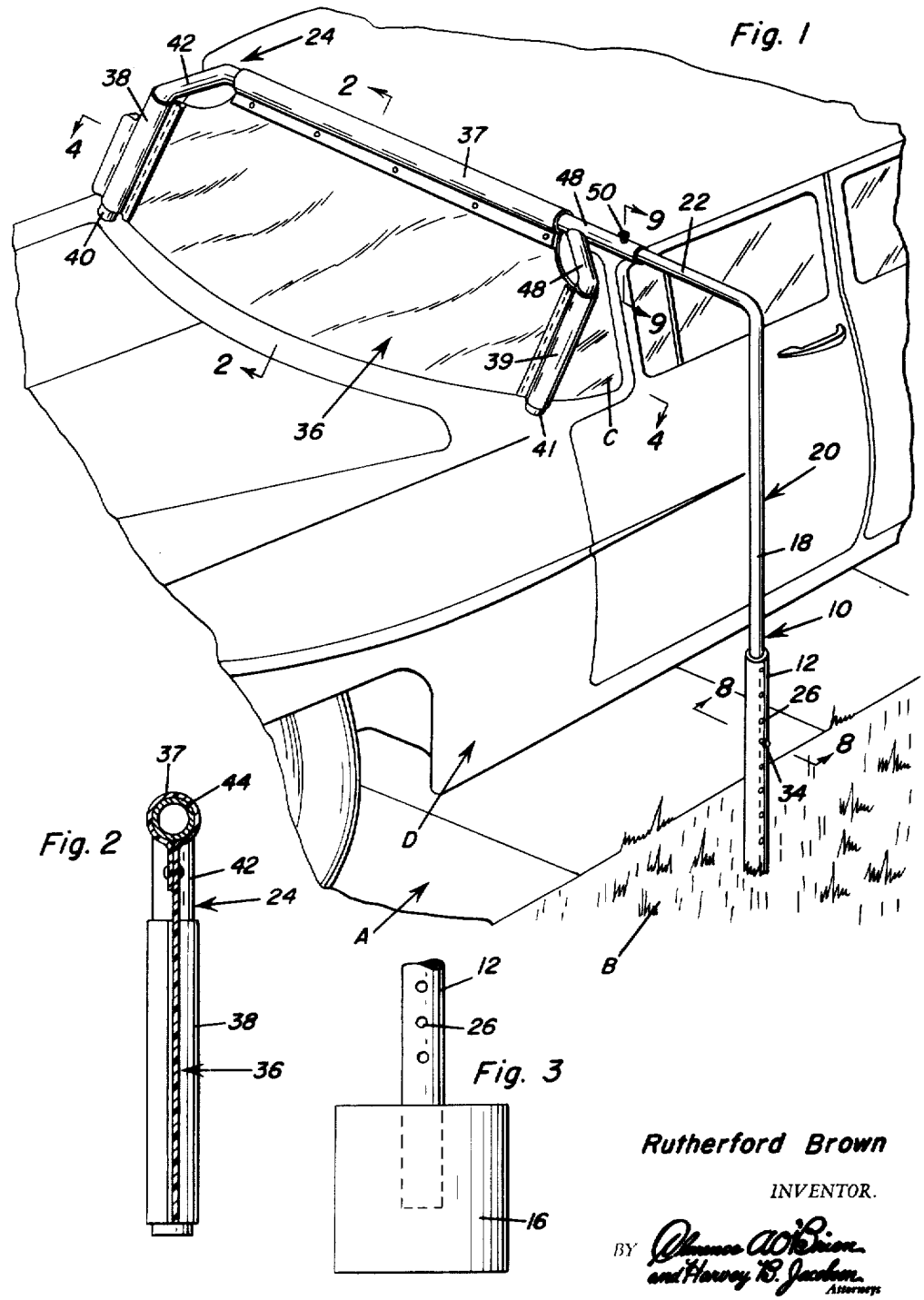

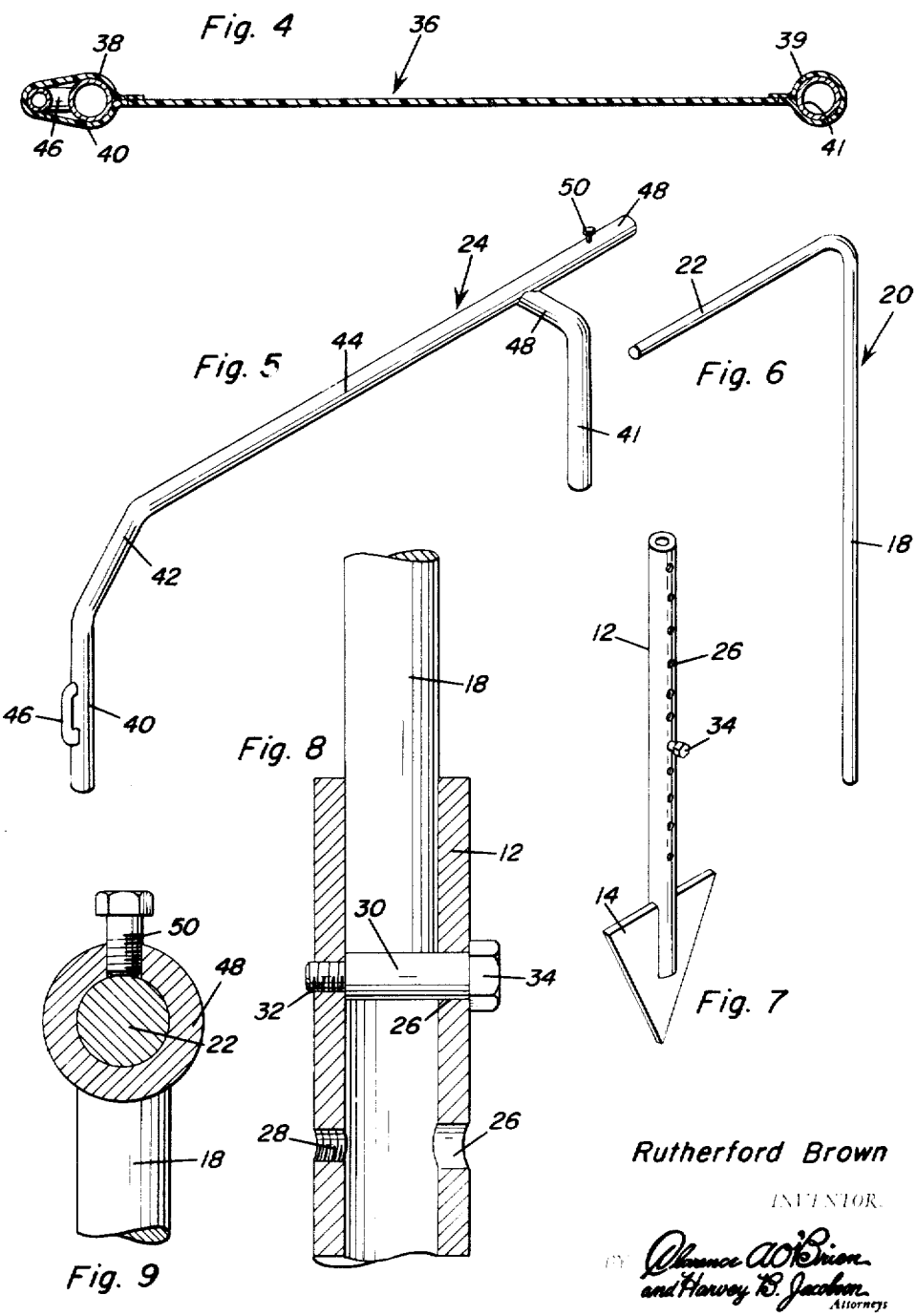

2,956,573

AUTOMOBILE WINDSHIELD COVER

Rutherford Brown, Elm St., Jefferson, Ga.

Filed June 1, 1959, Ser. No. 817,138

5 Claims. (Cl. 135—5)

The present invention relates to a readily applicable and removable windshield cover which may be advantageously used to substantially prevent, when properly applied, the accumulation of snow, ice or frost on the exterior surface of a windshield when, for example, the automobile has been parked in a driveway or along the curb in the street in a well known manner.

Although it is desirable to minimize the depositing of snow, frost and ice on a windshield while an automobile is parked overnight not all inventors engaged in this line of endeavor are of a common mind as to how best to achieve satisfactory results.

Many and varied adaptations have been offered and, generally speaking, the most popular approach, by and large, involves the use of various styles and types of hoods which can be applied and removed. Although such hoods are advantageous it is apparent that the constant application and removal night and morning and storing the hood in a manner to keep it in acceptable shape when not in use constitute factors which have acted as a deterrent to adoption and use of hoods. In any event, hoods and equivalent covers have, evidently, not met with widespread adoption and use. An object of the instant invention is to provide cover means which can be readily swung into position for use, and when not in use, swung into an out-of-the-way position. While the cover could be adapted for use on the back or rear window as well as the front windshield, it is believed that ordinarily and so far as the average driver is concerned, keeping the windshield in satisfactory driving condition is of first importance. In any event, and to simplify the presentation of the present accomplishment, novelty is predicated on a stand characterized by an upright anchored or otherwise secured in the edge of the lawn or elsewhere adjacent to the marginal edge of the driveway. To this end the stand has a vertical portion and also a horizontal arm portion which can be swung in a horizontal plane about a vertical axis. The horizontal arm is provided with a suitably mounted transparent or equivalent plastic or similar windshield cover. The cover is conformably or, substantially so, shaped to provide satisfactory contact with the windshield.

More specific features and advantages and objectives will become apparent from the following specification and the invention as claimed and illustrated in the accompanying drawings.

In the drawings, wherein like numerals are employed to designate like parts throughout the views:

Fig. 1 is a perspective view showing a fragmentary portion of an automobile in a driveway and illustrating the stand and windshield cover and the manner which the over-all structure is preferably used.

Fig. 2 is a section on an enlarged scale taken on the plane of the vertical line 2—2 of Fig. 1, looking in the direction of the arrows.

Fig. 3 is a view showing how, if desired, the base member of the adjustable upright means may be fastened in a concrete block or the like to be supported or, if desired embedded in the ground.

Fig. 4 is a horizontal section on the line 4—4 of Fig. 1.

Fig. 5 is a perspective view of one of the components of the cover suspension frame.

Fig. 6 is a perspective view of the L-shaped member of the stand portion of the over-all assemblage.

Fig. 7 is a perspective view of the base portion of the upright means which has a triangular anchoring plate to be driven and submerged and anchored in the ground.

Fig. 8 is an enlarged view showing the supporting bolt, a part of the upright construction, the section being on the line 8—8 of Fig. 1.

Fig. 9 is a section on the plane of the line 9—9 of Fig. 1.

As will be evident the invention is intended to be installed, as a general rule, alongside of a driveway which is denoted generally in Fig. 1 at A. More specifically there is a suitable sectional and adjustable stand provided and this will be mounted on the lawn as at B. It could be, of course, that the stand could be installed across the front of one's property where an automobile is left parked overnight in the street alongside the curb, as is sometimes the case in residential areas. In any event the stand is characterized by a sectional knockdown upright denoted generally by the numeral 10. This "upright" has a tubular or an equivalent socket member 12 which is anchored in the ground. For example as shown in Fig. 7, this member is provided at the bottom with a triangular pointed anchor 14 which is forced and secured, much like an anchor post, in the ground. In some instances where a concrete footing or foundation is desired this would take the form of a block or the like 16 (Fig. 3) under which conditions the post or primary upright member 12 would be anchored in the concrete and the concrete set in the ground. In either instance the post provides the socket for telescoping, removable and pivotal mounting of the vertical member 18 of an L-shaped support 20. The horizontal member or arm of the support is denoted at 22 and this will be of a length to partly extend over and above the driveway in the manner shown so that it will accommodate the readily attachable, detachable and adjustable frame 24. Before discussing the frame, reference will be made to Fig. 8 where it will be seen that the socket member 12 is provided with bolt holes 26 and diametrically opposite screw-threaded holes 28 to accommodate the selectively usable supporting bolt 30. The shank of the bolt passes through the hole 26 and bridges the bore of the socket member and it has a reduced screw-threaded shank 32 which screws into the hole 28. The flat-faced head or tool grip is denoted at 34. If this type of a connection and support between the parts 18 and 12 is not desired it would be within the purview of the invention to use a setscrew arrangement (not detailed).

Returning to the frame 24 this provides the adapter and support for the sheet material cover means. This cover will preferably be flexible transparent plastic material or the like, the same being denoted at 36. The cover will of course have a general shape to conform to the windshield C of the automobile D. The sleeves or hems 38 and 39 at the ends fit removably over the lateral frame members 40 and 41. The member 40 is joined by way of a suitably angled connection 42 with one end of the tubular main frame member 44 and it is provided on one side with a suitable hand-grip 46. There is an offsetting lateral bend or bent portion 48 connecting the frame member 41 with the right-hand end portion of the frame member 44. The extending end portion of the member 34 as at 48 provides a socket for reception of the horizontal arm 22 of the aforementioned L-shaped upright member 20. A setscrew 50 in the socket member provides the desired separable and adjustable coupling between the L-shaped member 20 and the cover carrying frame 24. It follows that when the frame is in position it can be extended to reach to whatever position of employment is desired in relation to the driveway and the automobile. It may be necessary to shift the position of the frame and cover from time to time in order to bring the invention in cooperable association with the windshield. Only experience may be relied upon to tell this story fully. In any event we have a frame 24 with a cover for a windshield and which defines a socket member 18 to accommodate the arm portion 22 of the L-shaped member 20 with the L-shaped member being a part of either the upright means or the structure referred to generally as a "stand." The vertical part of the L-shaped member is telescopically and rotatably and removably fitted into the socket member 12. With the height adjustments available, and the position of the frame relative to the center of the driveway adjustable and variable, it will be evident that the over-all construction will satisfactorily serve the purposes for which it is intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A windshield snow, ice and frost preventing device comprising a frame having an elongated hollow frame member one end of which is open and provides a socket, the other end being laterally bent, a complemental laterally bent member also connected to an intermediate portion of the first named frame member and said one laterally bent end, and said laterally bent member together with the intervening frame member providing an inverted U-shaped frame, a windshield cover having hems at the ends thereof fitting removably over said laterally bent members and also having a third lengthwise hem embracing and fitted for use over that portion of the frame between the laterally bent members, and means for supporting said frame and windshield cover in a useful position in relation to a windshield of an automobile after the same has been parked, for example, parked in a driveway, said means embodying a stand.

2. A windshield snow, ice and frost preventing device comprising a frame having an elongated hollow frame member one end of which is open and adapted to provide a socket, the other end being laterally bent, a complemental laterally bent member also connected to an intermediate portion of the first named frame member and said one laterally bent end, and said laterally bent member together with the intervening frame member providing an inverted U-shaped frame, a windshield covering having hems at the ends thereof fitting removably over said laterally bent members and also having a third lengthwise hem embracing and fitted for use over that portion of the frame between the laterally bent members, and means for supporting said frame and windshield cover in a useful position in relation to a windshield of an automobile after the same has been parked, for example, parked in a driveway, said means embodying a stand, said stand embodying an upright which is adapted to be embedded in the ground alongside the driveway, and a substantially L-shaped member, said L-shaped member having a vertical part removably and adjustably mounted in said upright, and a horizontal arm fitting telescopically, adjustably and removably in the socket provided in the aforementioned frame.

3. A windshield snow, ice and frost preventing device comprising cover means adapted to substantially cover the exterior surface of a windshield of an automobile which is parked, for example in a driveway, frame means supporting said cover, a stand having upright means adapted to be embedded in the ground alongside the driveway, said frame means being detachably and adjustably connected with said stand, said frame means comprising a main frame member one end of which is hollow to provide a socket, one end being laterally bent, and a complemental laterally bent member connected to an intermediate portion of said frame member, said last named member and said laterally bent one end providing limbs, said cover means having hems at the ends thereof fitted removably over said limbs and having a third hem embracing and fitted for use on that portion of the frame member between the laterally bent one end and said complemental laterally bent member.

4. An automobile windshield covering device comprising frame supporting means embodying a stand, said stand embodying an upright which is adapted to be embedded in the ground adjacent to a marginal edge running alongside a driveway or the like, a substantially L-shaped member having a vertical part removably and adjustably mounted in said upright and a horizontal arm, a temporarily usable cover for the automobile windshield adapted to be spread tautly over the exterior surface of the windshield in a manner to prevent the accumulation thereon of snow, ice and frost, a frame, said cover being removably mounted on said frame and said frame embodying a horizontal member provided with a socket at one end thereof, an end portion of the aforementioned horizontal arm fitting telescopically, removably and adjustably into said socket.

5. The structure defined in claim 4, and wherein said frame is characterized by a pair of longitudinally spaced generally parallel approximately coplanar lateral members cooperating with end portions of said cover, said cover having end hems and said hems being removably fitted over the laterally bent members.

References Cited in the file of this patent

UNITED STATES PATENTS

| Re. 1,816 | Palmer | Nov. 8, 1864 |
| 2,694,231 | Bermejo | Nov. 16, 1954 |
| 2,757,678 | Stahl | Aug. 7, 1956 |
| 2,869,562 | Francis | Jan. 20, 1959 |